Patented July 11, 1950

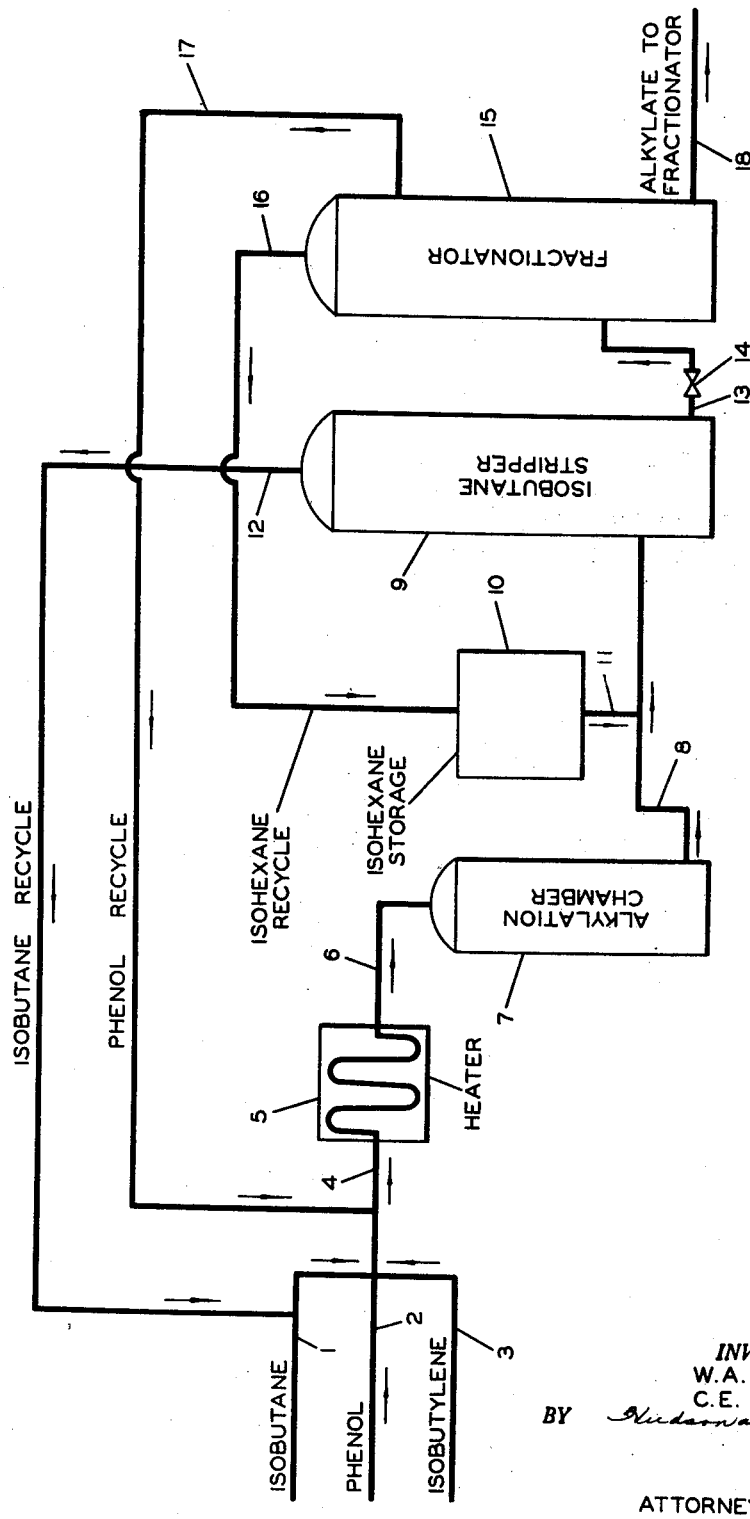

2,514,419

UNITED STATES PATENT OFFICE 2,514,419

PHENOL ALKYLATION PROCESS

Walter A. Schulze and Charles E. Stoops, Bartlesville, Okla., assignors to Phillips Petroleum Company, a corporation of Delaware Application March 11, 1946, Serial No. 653,591

6 Claims. (Cl. 260—624)

This invention relates to a process for the catalytic alkylation of phenols with olefins to produce alkyl phenols.

The alkylation of phenols has been accomplished in the presence of catalysts of the Friedel-Crafts type as well as with strong mineral acids and the procedures have included the use of alkyl halides and alcohols as alkylating agents. There are numerous disadvantages inherent in these processes such as low yields realized, large quantities of condensing agent required, sludge disposal problems, non-selectivity of catalysts and the like. The high operating costs attendant in these phenol alkylation processes render such procedures economically unattractive, if, indeed, they are at all feasible for large scale operations.

The alkylation of phenols is particularly complicated on account of the high reactivity of the phenolic group in the presence of catalysts which have been used in such alkylations. For example, undesirable aralkyl ethers are formed in relatively large quantities when attempts are made to introduce alkyl groups into the nucleus of phenols. Other side reactions occur, resulting from the non-selectivity of the catalyst, giving rise to a variety of extraneous products. The formation of relatively large amounts of polysubstituted phenols is frequently noted thus accounting for greatly decreased yields of the desired monoalkyl derivatives.

It is an object of the present invention to provide a novel process for the alkylation of phenols with olefins. It is a further object of the present invention to effect the synthesis of alkyl phenols through the interaction of phenols with olefins in the presence of low boiling hydrocarbon diluents over a suitable catalyst wherein means are provided for the effective separation of the diluent from the products of the reaction.

We have now found a new process for effecting phenol alkylation wherein said phenol, in admixture with a low boiling hydrocarbon diluent, is contacted with a mono-olefin in the presence of a solid adsorbent catalyst comprising a synthetic precipitated silica gel promoted by impregnation with relatively minor proportions of certain metal oxides such as aluminum oxide, titanium oxide, zirconium oxide and the like. When these catalysts are employed, reaction conditions may be so selected that monoalkyl phenols are present almost exclusively in the reaction products. The efficiency of this process is evidenced by the unusually high yields of alkyl phenols obtained. Thus, when the preferred catalysts of this invention are used, side reactions are held at a minimum, no more than minute amounts of aralkyl ethers are formed and the yields of polyalkylated phenols are unusually low. In accordance with our invention we have found that the operation of the present invention is greatly facilitated when a low boiling, inert diluent is employed, said diluent providing a means of temperature control and substantially preventing the formation of undesirable by-products. For example, in the alkylation of phenol with isobutylene to produce tert-butylphenol, isobutane has been found to be especially advantageous. However, difficulties may arise in the stripping step wherein isobutane is removed from the unchanged phenol and its alkylation products. The removal of this low boiling diluent must necessarily be accomplished at superatmospheric pressures with the operation usually being carried out at pressures of about 65 to 85 pounds per square inch. Under conditions which prevail in a stripping operation of this type, high kettle temperatures are required in order to insure complete removal of the diluent. At these high temperatures the phenols not only undergo decomposition but they are corrosive and thus marked decreases in the yields of the desired products are noted. The increased heating and cooling costs and the additional equipment required, coupled with the corrosion losses which occur as a consequence of high temperature operations, make production costs sufficiently high that processes of this nature may not be economically sound. Furthermore, the shortened equipment life which results from high temperature reactions presents a serious problem in plant operations.

In order to obviate the disadvantages resulting from the high temperatures reached in the isobutane stripping step, an intermediate boiling hydrocarbon diluent containing from about six to about eight carbon atoms per molecule, such as isohexane, is added to the mixture after the catalytic reaction but before distillation, thus affording a means of substantially complete removal of the low boiling diluent while at the same time avoiding exposure of the phenols to excessive temperatures in the stripping column. For example, in stripping isobutane from a mixture containing phenol and tert-butylphenols reboiler temperatures of 550° F. or greater are required for complete separation of isobutane. At this level the corrosive action of phenols becomes pronounced and considerable decomposition is noted. Addition of isohexane serves to lower the required temperature about 200° F. or more and at the same time all isobutane is driven out of the column. Small quantities of isohexane are usually carried overhead with the isobutane and the mixture recycled to the initial isobutane feed stream. Since isohexane exerts a solvent action on the feed mixture, it need not be separated from the low boiling diluent. Subsequent to the isobutane stripping operation the added intermediate boiling hydrocarbon is removed in an additional fractionating step and recycled to the stripping zone. Atmospheric pressure is used in this fractionating step in contrast to superatmospheric pressure in the preceding step and thus high kettle temperatures are avoided. This operation also serves for the removal of the unconverted phenol which is recycled to the initial feed stream. Small quantities of isohexane remain with the phenol and are recycled. Normal hexane and the normal and iso-heptanes and octanes may also be used instead of isohexane.

The process to which this invention applies, therefore, comprises the contacting of controlled proportions of phenol olefin, in the presence of a low boiling, inert hydrocarbon diluent, with an adsorbent, metallic oxide promoted silica gel catalyst under alkylating conditions chosen so as to produce a high conversion of the olefin. The hydrocarbon feed mixture may be passed continuously through a stationary bed of granular catalyst, or otherwise contacted with the solid catalyst, and the effluent passed to a stripping zone to effect complete removal of the diluent. The stripping zone is provided with a means for introducing an intermediate boiling inert hydrocarbon diluent which insures complete removal of the low boiling diluent at kettle temperatures low enough to substantially prevent decomposition of the phenols. The low boiling diluent is recycled to the alkylation unit while the mixture comprising chiefly unchanged phenol, alkylate and intermediate boiling hydrocarbon is passed to a fractionating zone where the hydrocarbon and unchanged phenol are taken overhead, the hydrocarbon being recycled to the stripping zone and the phenol being returned to the alkylation unit. Fractionation of the alkylate comprising essentially monoalkyl derivatives, with small amounts of polyalkylated products, yields the respective compounds in a high degree of purity. An excess of phenol is present in the feed and provision is made for the introduction of additional quantities of olefin as the unconverted material is recycled to the reaction zone. The olefin may be introduced into the phenol stream, or directly into the catalyst chamber, to maintain the phenol-olefin ratio at the desired level. The intermediate boiling diluent boils above the boiling point of the low boiling diluent, and below that of the alkyl phenol obtained.

Usually the selected phenol in admixture with the desired molar proportion of olefin and inert diluent is contacted at a pressure such as to maintain liquid or mixed phase operation, generally in the range of about 400 to 1500 pounds per square inch, at a temperature in the catalyst chamber of from about 200 to 500° F., with a bed of granular, gel type catalyst comprising silica promoted with a minor proportion of a metallic oxide. The mol ratio of phenol to olefin may range from slightly more than 1:1 to about 10:1 with a ratio of 2:1 to 3:1 generally preferred. The flow rate, and, therefore, the contact time within the catalyst chamber, is controlled in order to permit extensive reaction of the olefin so that the effluent from the reactor comprises largely unconverted phenol, monoalkyl phenol and a small amount of higher boiling material consisting chiefly of dialkyl products. Flow rates of about one to about ten volumes of total feed mixture, comprising reactants and diluent, per volume of catalyst per hour are satisfactory for efficient operation of the process. The effluent from the alkylation unit is passed to the stripping zone where an intermediate boiling hydrocarbon diluent is added and the low boiling diluent is taken overhead and returned to the charge source. Sufficiently large quantities of this intermediate boiling hydrocarbon are added so that when it is incorporated into the effluent from the alkylation unit the vapor pressure of the mixture will equal the pressure on the stripping column. The remaining material from the stripping zone is passed to a fractionating zone for the separation and recycling of the unconverted phenol and the intermediate boiling diluent. Subsequent to the removal of these materials, the alkylate is fractionated and high yields of alkyl phenols are obtained. Instead of isobutane as the low-boiling diluent, other readily separable and inert materials, such as the $C_3$–$C_5$ paraffins including propane, butane and the pentanes, may be used. These diluents are preferred in view of the desirability of maintaining liquid or mixed phase conditions in the reaction.

The figure illustrates diagrammatically one method of carrying out the process of our invention. A feed stream comprising isobutane, phenol and isobutylene from lines 1, 2 and 3, respectively, is passed via line 4 to heater 5, line 6 and thence to the alkylation chamber 7 wherein a high conversion of the isobutylene is realized. The effluent from the reactor, comprising essentially alkyl phenols, unconverted phenol and isobutane, passes via line 8 to the isobutane stripper 9. Isohexane from storage tank 10 is introduced into the effluent stream by means of line 11. Pressure in the isobutane stripper is maintained about 75 pounds per square inch. Isobutane, containing small amounts of isohexane, is taken overhead through line 12 and recycled to line 1 containing the isobutane stream while the unconverted phenol and alkylated products are passed through line 13 and expansion valve 14 to fractionator 15 which is operated preferably at atmospheric pressure. In fractionator 15 isohexane is taken overhead via line 16 and recycled to the isohexane storage tank 10 while phenol removal is accomplished via line 17 and the phenol returned to line 4 where it is introduced into the initial feed stream. The remaining materials in fractionator 15, comprising largely monoalkyl phenols and small amounts of higher boiling products consisting chiefly of di- and trisubstituted derivatives, are led via line 18 to a fractionator where the products are separated.

The decrease in kettle temperature in the stripping column realized through the addition of an intermediate boiling hydrocarbon diluent is about 200° F. or more depending upon the composition of the feed mixture. This fact may be illustrated with a feed stream of the following composition:

| Component: | Mol per cent |
|---|---|
| Propylene | 4.2 |
| Propane | 2.4 |
| Isobutylene | 0.6 |
| Isobutane | 52.2 |
| Pentanes | 0.9 |
| Diisobutylene | 4.0 |
| Phenol | 26.6 |
| tert-Butylphenol | 9.1 |

Complete removal of the isobutane requires a kettle temperature around 500 to 550° F. when no intermediate boiling diluent is added. However, if a hydrocarbon such as isohexane is introduced prior to the distillation in an amount equal to 21.3 mol per cent of the total feed, a kettle temperature of about 350° F. is sufficient for the deisobutanizing operation.

The solid adsorbent catalysts preferred in the alkylation step of the present process are most accurately described as dried gels and are characterized by their chemical composition, their physical properties and by the specific methods of preparation, said methods being responsible in large part for their chemical activity. Although these catalysts are broadly referred to as metallic oxide promoted, silica gel compositions, it is to be understood that they have distinctly different catalytic properties from the naturally occurring minerals which contain some of the same components. For example, the acid treated bleaching earths, clays, kaolins and similar naturally occurring silicates bear no resemblance in composition to our preferred synthetic catalysts.

The catalysts employed in this invention are prepared by forming a hydrous silica gel or jelly usually from an alkali metal silicate and an acid, washing soluble material from the gel, treating or activating said gel with an aqueous solution of a suitable metal salt, and subsequently washing and drying the treated material. In this manner part of the metal, presumably in the form of a hydrous oxide or loose hydroxide compound formed by hydrolysis, is selectively adsorbed by the hydrous silica and is not removed by subsequent washing. The most frequently used catalyst of this type is a silica-alumina catalyst prepared by treating a wet or partially dried hydrous silica gel with an aluminum salt solution, such as a solution of aluminum chloride or sulfate, and finally washing and drying the treated material. Other catalysts of a similar nature may be prepared by using, instead of an aluminum salt, a hydrolyzable salt of a metal selected from Group III-B or from Group IV-A of the periodic system. More particularly, salts of indium and thallium in addition to aluminum in Group III-B, and salts of titanium, zirconium and thorium in Group IV-A are employed. Whether prepared by this method or by some modification thereof, the catalyst will contain a major portion of silica and a minor portion of metal oxide. This minor portion of metal oxide, such as alumina, will generally not be in excess of 10 per cent by weight and will more often range from 0.1 to 2.0 per cent by weight.

The reactants of the present invention comprise phenols and mono-olefins. Suitable phenolic intermediates include phenol and its alkyl derivatives as well as catechol, hydroquinone and resorcinol. Olefins applicable in the present process are mono-olefins containing at least three carbon atoms and preferably those olefins having branched chains. Straight chain olefins are also included within the scope of the disclosure. Isobutylene is a preferred branched chain olefin. Other olefins which may be used included propylene, butenes 1 and 2, and the pentenes as well as higher olefins.

While the synthetic, gel type catalysts described herein are preferred and have been shown to produce superior results, it is to be understood that the use of diluents such as those described herein may be extended to phenol alkylation effected in the presence of other catalysts.

*Example*

The alkylation of phenol with isobutylene in the presence of silica-alumina as a contact catalyst was effected in a steel reactor at a temperature of 300 to 400° F. and a pressure of 1300 pounds per square inch over a 15.6-hour period. A preheated feed stock comprising phenol, isobutylene and isobutane in a mol ratio of 2.5:1:4.5, respectively, was fed into the reaction chamber from charge bombs under nitrogen pressure at a flow rate of 4.8 volumes of feed per volume of catalyst per hour. The rate of flow of the feed was controlled by a valve on the downstream side of the reactor. The reactor effluent comprising largely unconverted phenol and alkylated phenol was fed into a deisobutanizer together with isohexane which was introduced into the feed stream prior to entrance into the stripping column. Isohexane was added in an amount equal to about 21.3 mol per cent of the total feed. The deisobutanizing column was operated at a pressure of 75 pounds per square inch and a kettle temperature of 350° F. The isobutane was taken overhead, together with small quantities of isohexane, and the mixture recycled to the initial feed stream ahead of the preheater. The material remaining in the stripping column, comprising largely isohexane, unconverted phenol and alkylated phenol, was passed through an expansion valve where the pressure was reduced to atmospheric and then fed into a fractionator where isohexane and phenol were taken overhead, the isohexane being returned to the storage tank preparatory to being utilized further and the phenol containing small quantities of isohexane being recycled to the initial feed stream. The alkylate was fractionated in the conventional manner and the following yields, based on phenol consumed, were obtained:

| Product: | Mol per cent |
|---|---|
| Total tert-butylphenols | 98.2 |
| p-tert-Butylphenol | 70.3 |
| o-tert-Butylphenol | 21.5 |
| di-tert-Butylphenol | 6.4 |

The low boiling diluent is introduced into the alkylation zone in any desired proportion but in general a range of about 10 to 100 mol per cent of diluent based on reactants will be preferred. The intermediate boiling diluent is also utilized to the extent required to obtain effective separation and generally 10 to 50 mol per cent of the total feed to the distillation zone will be satisfactory.

While we have described our invention with reference to various specific embodiments and exemplifications, it will be obvious to those skilled in the art that our invention is not limited to the details thereof but may be practiced and embodied in various ways within the scope of the claims hereinafter made.

We claim:

1. A process for the catalytic alkylation of a phenol with a mono-olefin which comprises admixing said phenol with said mono-olefin and with a $C_3-C_5$ paraffinic hydrocarbon diluent, contacting said mixture with a catalyst for the alkylation under alkylation conditions, introducing the reaction products together with said diluent into a fractionation zone operated at super-atmospheric pressure for the separation overhead of said diluent, and facilitating separation of said diluent while avoiding excessive kettle temperatures by introducing into the fractionation zone an intermediate boiling hydrocarbon diluent having 6–8 carbon atoms.

2. A process for the preparation of alkyl phenols which comprises contacting phenol and a mono-olefin under alkylation conditions with an alkylation catalyst in the presence of a $C_3-C_5$ paraffin hydrocarbon serving as a low boiling diluent; separating the reaction effluent containing products of reaction, unreacted material, and diluent; fractionating the reaction effluent at super-atmospheric pressure along with a $C_6$–$C_8$ paraffin hydrocarbon serving as an intermediate boiling diluent to permit separation of the low boiling diluent at a lower kettle temperature than would be required in the absence of said intermediate boiling diluent and separating said low boiling diluent as an overhead product; further fractionating the residual material at a lower pressure to separate the intermediate boiling diluent from the alkyl phenol product; recycling said low boiling diluent to the alkylation zone; and recycling said intermediate boiling diluent to the fractionation zone for further use in facilitating separation of the low boiling diluent.

3. In the catalytic alkylation of a phenol with a mono-olefin wherein the reaction is carried out in the presence of an inert low boiling $C_3$–$C_5$ paraffin hydrocarbon diluent in order to control reaction temperature and minimize the formation of undesirable by-products, and wherein the low boiling diluent is separated from the products of reaction by fractional distillation, at super-atmospheric pressure the method of separating said low boiling diluent which comprises introducing into the distillation zone a $C_6$–$C_8$ inert hydrocarbon diluent having a boiling point intermediate that of the low boiling diluent and the alkylated phenol, and carrying out said distillation at a lower kettle temperature than would otherwise be required to effect substantially complete separation overhead of the low boiling diluent thereby minimizing the effects of high kettle temperatures upon the products of reaction.

4. A process according to claim 2 wherein the mono-olefin is isobutylene, wherein the low boiling diluent is isobutane, and wherein the intermediate boiling diluent is isohexane.

5. A process according to claim 2 wherein the mono-olefin is isobutylene, wherein the low boiling diluent is isobutane, the intermediate boiling diluent is isohexane, and the catalyst is a synthetic silica gel impregnated with a minor proportion of aluminum oxide.

6. A process according to claim 2 wherein the separation of the low boiling diluent is effected at a pressure of 65 to 85 pounds per square inch and separation of the intermediate boiling diluent is effected at atmospheric pressure.

WALTER A. SCHULZE.
CHARLES E. STOOPS.

REFERENCES CITED

The following references are of record in the file of this patent:

UNITED STATES PATENTS

| Number | Name | Date |
| --- | --- | --- |
| 1,892,990 | Linner | Jan. 3, 1933 |
| 2,086,810 | Langwell | July 13, 1937 |
| 2,176,396 | Fenske et al. | Oct. 17, 1939 |
| 2,198,595 | Amos | Apr. 30, 1940 |
| 2,352,200 | Ipatieff | June 27, 1944 |
| 2,410,111 | Thomas | Oct. 29, 1946 |